Figure 1:
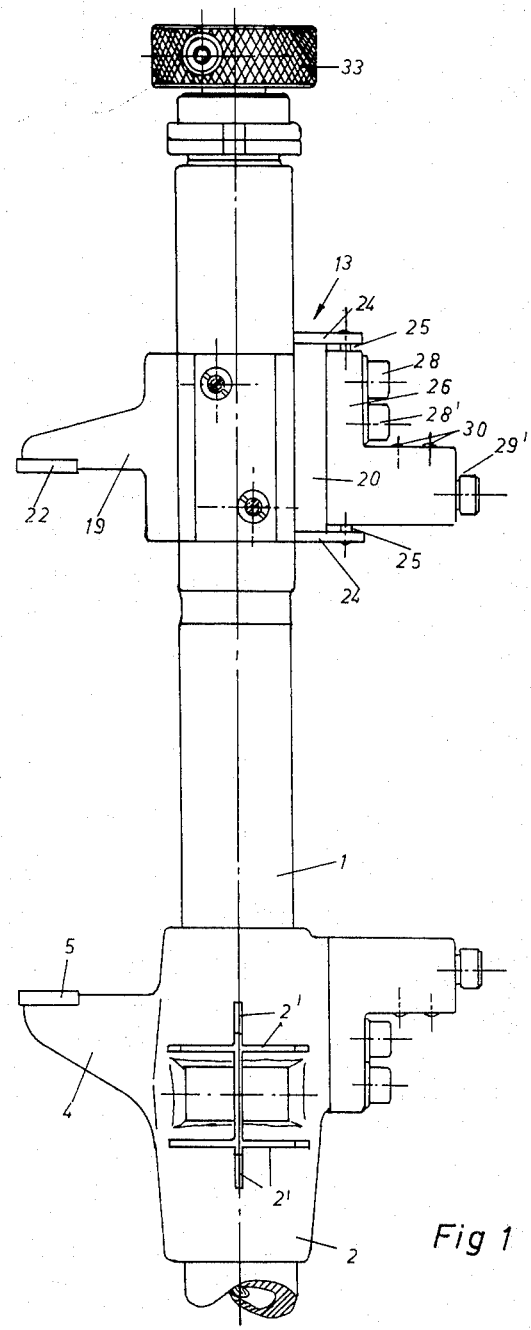

March 22, 1966     P. MÜLLER     3,241,241
LINEAR MEASUREMENT DEVICE

Filed Oct. 14, 1963     3 Sheets-Sheet 1

INVENTOR:
Paul Müller

March 22, 1966  P. MÜLLER  3,241,241

LINEAR MEASUREMENT DEVICE

Filed Oct. 14, 1963  3 Sheets-Sheet 2

INVENTOR:
Paul Müller
BY
Darbo, Robertson, Vandenburgh.
attys.

March 22, 1966  P. MÜLLER  3,241,241
LINEAR MEASUREMENT DEVICE

Filed Oct. 14, 1963  3 Sheets-Sheet 3

INVENTOR:
Paul Müller
BY
Darby, Robertson & Vandenburgh.
attys.

United States Patent Office 3,241,241
Patented Mar. 22, 1966

---

3,241,241
LINEAR MEASUREMENT DEVICE
Paul Müller, Eschweiler, Germany, assignor to Kordt & Co., Eschweiler, Germany
Filed Oct. 14, 1963, Ser. No. 315,745
Claims priority, application Germany, Oct. 15, 1962, K 47,973
4 Claims. (Cl. 33—143)

My invention relates to a linear measurement device, such as for the measurement of diameters, gear tooth widths, distances of holes from each other, or the like.

One object of my invention is to provide a device of this type which enables the measurement of inside and outside dimensions with great accuracy.

A further object of my invention is to enable the measurement of the difference of an inside diameter, for example of a borehole, and an outside diameter, for example of a shaft, directly and independent of the absolute amounts.

A further object of my invention is the measurement of an inside and an outside dimension at the same measuring pressure.

A still further object of my invention is to provide a device of the aforementioned type, wherein the metering elements for inside and outside dimensions can be adjusted to a desired value at the same time and over a wide range.

Another object of my invention is to provide a device of the aforementioned kind, wherein the jointly movable metering elements can be adjusted relatively to each other, and definite differences between inside and outside dimensions can accurately be adjusted.

In accordance with this invention, first and second inside caliper elements project from first and second heads which are supported for relative rectilinear movement, and have caliper surfaces facing in opposite directions for engagement with diametrically opposed portions of an internal cylindrical surface, and first and second outside caliper elements also project from the first and second heads and have caliper surfaces facing toward each other for engagement with diametrically opposite portions of an external cylindrical surface. With this arrangement, it is possible to conveniently measure both inside and outside dimensions with a single unitary device and in addition comparative measurements can be made independently of absolute dimensions. For example, the inside diameter of a bore hole and the outside diameter of a shaft to be placed in the hole can be readily and accurately compared.

According to an important feature of the invention, the caliper heads are mounted on an elongated support in a manner to permit accurate measurements of dimensions within a wide range.

Another important feature of the invention is in the provision of spring means acting between the caliper heads and selectively operable for urging the inside caliper elements away from each other for inside measurements and the outside caliper elements toward each other for outside measurements. Preferably, the spring means is arranged to operate with equal force as one caliper head is moved relative to the other in one direction and the other from a certain neutral position.

Other important features of the invention relate to the mounting of one of the heads by means of anti-friction means in a manner to permit free movement thereof, to the construction of the device for use with a standard dial gauge or the like, and in the provision of adjustment means for permitting accurate measurements in a variety of applications.

Figure 2:
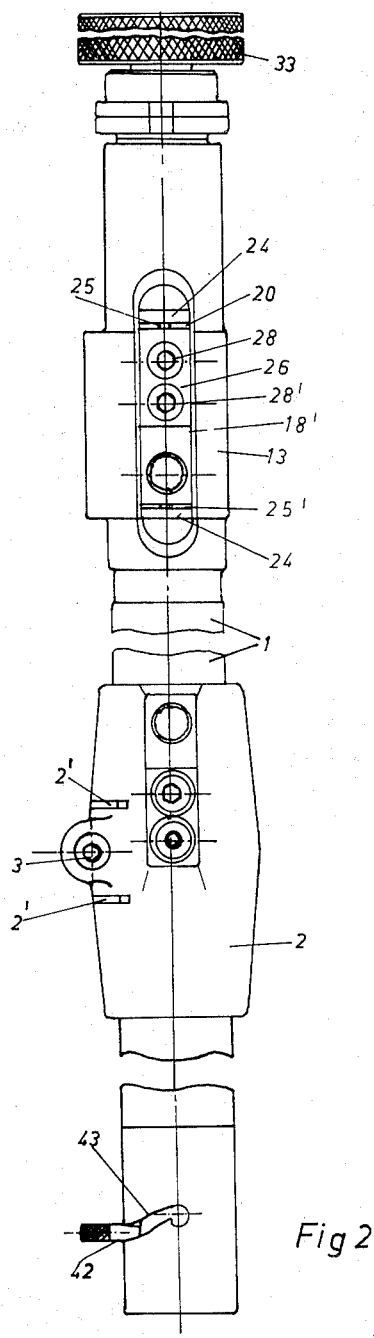
Figure 3:
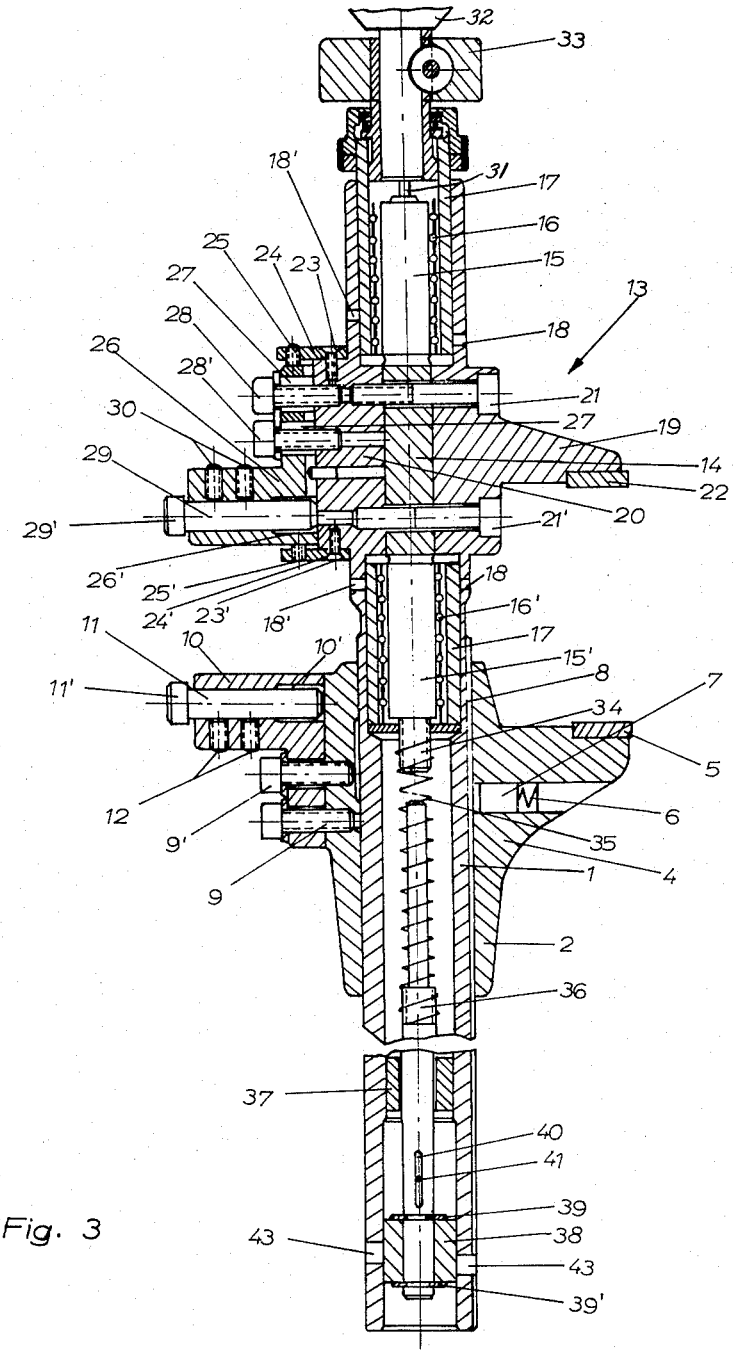

These and other objects and features of my invention shall be explained by the following description reference being had to the accompanying drawings, wherein FIG. 1 shows a front view of the linear measurement device of my invention, FIG. 2 is a side elevational view, and FIG. 3 shows a longitudinal sectional view thereof.

A slide 2 is guided on a tubular support 1. Slide 2 is made radially yielding by means of slots 2' and can be clamped to the support 1 in any position by means of a clamping device 3. The slide 2 is provided with a lateral bracket-line projection 4, which carries a plane, hardened plate 5 serving as a contact surface.

A key 7 loaded by a spring 6 slides in the projection 4, and extends into a longitudinal groove 8 of the support 1 and secures the slide 2 against rotation.

On the side of the slide 2 opposite to the projection 4, a bracket 10 is screwed to the slide 2 by means of two screws 9, 9'. A bolt 11 is inserted into a borehole 10' of the bracket 10, and is affixed by screws 12. The bolt 11 has a head 11' which serves as an abutment for the inside measurement and is so aligned that the lowermost portion of its cylindrical surface is in the plane of the surface of plate 5.

Above the slide 2 a caliper head generally designated by 13 is guided on the support 1 axially movably. The caliper or feeler head 13 comprises a square central portion 14 and round guide pins 15, 15' on opposite sides thereof. The guide pins 15, 15' are guided easily movable and free from play in bushings 17, 17' by means of antifriction bearings 16, 16'. Bushings 17, 17' are fixed in the tubular support 1.

Between the bushings 17, 17' two aligned axially slotted holes 18, 18' are provided in the support 1. A bracket-like projection 19 similar to projection 4 is guided in the slotted hole 18, whereas a carrier body 20 is guided in the opposite slotted hole 18'. The projection 19 and the carrier body 20 are rigidly screwed to each other and to the central portion 14 by means of screws 21, 21'. A hardened plate 22 acting as caliper surface is mounted on the projection 19 on the side facing towards the plate 5. Side plates 24, 24' are screwed to the front surfaces of the carrier body 20 by means of screws 23, 23' and extend outwards. These side plates 24, 24' are provided with adjusting screws 25 and 25', respectively. A bracket 26 is arranged between the adjusting screws 25, 25', through which two affixing screws 28, 28' extend through slotted holes 27 and 27', respectively. The bracket 26 can be screwed to the carrier body 20 by the screws 28 and 28'. With the screws 28 and 28' loosened, the bracket 26 can be moved by the adjusting screws 25, 25' relatively to the carrier body 20 and can thus be adjusted. A bolt 29 is set into a bore hole 26' of the bracket 26 and is affixed there by means of screws 30. The head 29' of the bolt 29 serves as a caliper or abutment surface for inside measurements. By shifting the position of bracket 26 on the carrier body 20, it can be so adjusted that the uppermost spot of the cylindrical surface of head 29' is in the plane of the surface of plate 22 or—if desired—higher or lower by a small amount. The feeler pin 31 of a dial gauge 32 (well known and therefore not described in detail) rests against the end face of the guide pin 15. The dial gauge is affixed to the head of the guide bushing 17 by a clamp device 33. The guide pin 15' is extended below by a threaded pin 34, to which a measuring spring 35 is affixed. The other end of the measuring spring 35 is affixed to a rod 36 which is axially movable in a sliding bearing piece 37 inside the support 1. At the lower end of the rod 36, a piston 38 rotatably guided in the support 1 is arranged between two snap rings 39, 39'. A slotted hole 40 is provided in the rod 36 for holding it against rotation. A pin 41 in the support 1 extends through said hole.

A pin 42 provided with a knurled end is screwed into the piston 38. Pin 42 extends through support 1 through a guide slot 43 similar to a bayonet catch. The piston 38 can be rotated by means of the pin 42, and thereby can be shifted from a lower to an upper position due to the action of the guide slot 43. By such a shifting of the piston 38 the rod 36 held against rotation is also moved from a lower to an upper position. Provision is now made that the measuring spring 35 acts as a tension spring in the lower position of the rod 36, and acts as a compression spring on the caliper head 13 with equal spring force in the upper position of the rod 36.

For measuring an outside dimension, for example a diameter, the workpiece is put between the contact surface of the plate 5 and the caliper surface of plate 22, and the rod 36 is moved into its lower position by pin 42 so that the measuring spring 35 holds the caliper head in contact with the workpiece with a certain measuring force. By adjusting the slide 2 and the dial gauge 32 under the control of the axial movement of the caliper head 13, provision can be made that the dial gauge indicates 0 (zero), if the workpiece has its desired dimension. Then deviations from the desired value towards + or —, which result in a displacement of the caliper head 13, can directly be read at the dial gauge 32.

At the same time, however, with the same adjustment of the device, an inside dimension corresponding to said outside dimension can be measured by placing the workpiece over the heads 11' and 29' of the measuring bolts 11 and 29, respectively, and by changing the measuring spring to compression by the pin 42. Thus the head 29' of the measuring bolt 29 rests against the workpiece from inside with the same measuring force. By means of the adjusting screws 25, 25' the head 29' of the caliper bolt can be aligned with the caliper surface of plate 22 so that the set values of the outside dimension (between 5 and 22) and of the inside dimension (between 11' and 29') are equal. Then the differences between outside dimension and inside dimension can be read directly at the dial gauge 32. This is particularly advantageous, if workpieces are to be measured which are to be assembled with a predetermined fit, for example a workpiece comprising a bearing borehole and a shaft or a workpiece having a centering collar and an attachment piece to be arranged thereon. By shifting the bracket 26 by means of the adjusting screws 25 and 25', the measuring device can be adjusted also in such a manner that the desired or set value of the outside dimension (between 5 and 22) deviates from the set value of the inside dimension (between 11' and 29') by a certain amount. It is essential that the measurement and adjustment both for the outside dimensions and for the inside dimensions are effected at the same measuring force exerted by the measuring spring 35 so that errors, for example due to bending of the support 1, are avoided. By the long guiding of the caliper slide 13 by means of the guide pins 15, 15' guided in antifriction bearings 16, 16', a low-friction, easily movable shifting of the caliper slide 13 is guaranteed.

It will be apparent for those skilled in the art from the foregoing description of an embodiment of my invention that several changes and modifications of this device can be made without departing from the spirit and the scope of this invention.

Invention is claimed as follows:

1. In a linear measurement device for use with a dial gauge having a feeler pin, a tubular support adapted to be secured at one end thereof to the dial gauge and having a longitudinal slot therein, a first caliper head reciprocable on said tubular support and having a portion projecting inwardly through said slot, means secured to said inwardly projecting portion of said first caliper head and extending within said tubular support toward said one end thereof for engagement with the feeler pin of the dial gauge, a second caliper head supported on said tubular member, and caliper elements on said first and second caliper heads.

2. In a linear measurement device, a tubular support having a longitudinally extending slot therein, a first caliper head on said tubular support and having a portion projecting inwardly through said slot, a pair of guide pins extending in axially opposite directions from said inwardly extending portion of said first caliper head, anti-friction bearing means between said guide pins and said tubular support for journalling said first caliper head for free movement along said tubular support, a second caliper head, means for securing said second caliper head on said tubular support, caliper elements on said first and second caliper heads, and gauge means for measuring displacement of said first caliper head relative to said tubular support.

3. In a linear measurement device, a tubular support, a first caliper head movable on said support, gauge means for measuring displacement of said first caliper head, a second caliper head fixed on said support, first and second inside caliper elements projecting from said first and second heads and having caliper surfaces facing in opposite directions for engagement with diametrically opposed portions of an internal cylindrical surface, first and second outside caliper elements projecting from said first and second heads and having caliper surfaces facing toward each other for engagement with diametrically opposite portions of an external cylindrical surface, said tubular support having a longitudinally extending slot therein, said first caliper head having a portion extending inwardly through said slot, a piston element shiftable in said tubular support, a spring connecting said piston element and said inwardly extending portion of said first caliper head and arranged to act in tension in a first position of said piston element to urge said outside caliper elements toward each other and to act in compression in a second position of said piston element to urge said inside caliper elements away from each other, said tubular element having a guide slot therein, and an operator pin secured to said piston and extending through said guide slot for moving said piston element between said first and second positions thereof.

4. In a linear measurement device for use with a dial gauge having a feeler pin, a tubular support adapted to be secured at one end thereof to the dial gauge and having a longitudinal slot therein, a first caliper head reciprocable on said tubular support and having a portion projecting inwardly through said slot, pin means secured to said inwardly projecting portion of said first caliper head and extending within said tubular support toward said one end thereof for engagement with the feeler pin of the dial gauge, anti-friction bearing means between said pin means and said tubular support for journalling said first caliper head for free movement along said tubular support, a second caliper head, means for securing said second caliper head on said tubular support, and caliper elements on said first and second caliper heads.

References Cited by the Examiner
UNITED STATES PATENTS
3,113,384 12/1963 Keszler _____ 33—143
FOREIGN PATENTS
411,226 7/1945 Italy.
250,403 6/1948 Switzerland.

LOUIS R. PRINCE, *Primary Examiner.*
ISAAC LISANN, *Examiner.*